United States Patent
Kondapi et al.

(10) Patent No.: US 10,372,939 B2
(45) Date of Patent: Aug. 6, 2019

(54) SYSTEM AND METHOD TO REMOTELY PROVISION OUT-OF-BAND SYSTEM

(71) Applicant: Dell Products L.P., Round Rock, TX (US)

(72) Inventors: Srikanth Kondapi, Austin, TX (US); Nathan F. Martell, Taylor, TX (US); Joseph Kozlowski, Jr., Hutto, TX (US); Abeye Teshome, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 239 days.

(21) Appl. No.: 15/611,090

(22) Filed: Jun. 1, 2017

(65) Prior Publication Data

US 2018/0349634 A1   Dec. 6, 2018

(51) Int. Cl.
*H04L 29/06* (2006.01)
*G06F 21/62* (2013.01)

(52) U.S. Cl.
CPC ...... *G06F 21/6245* (2013.01); *H04L 63/0823* (2013.01); *H04L 63/166* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 2002/0026503 A1* | 2/2002 | Bendinelli | .......... | H04L 12/4641 709/220 |
| 2002/0059392 A1* | 5/2002 | Ellis, III | .............. | A01N 25/30 709/208 |
| 2006/0092861 A1* | 5/2006 | Corday | .............. | H04L 41/0213 370/256 |
| 2006/0128305 A1* | 6/2006 | Delalat | ............. | G08B 13/1418 455/41.2 |

(Continued)

OTHER PUBLICATIONS

Intel Corporation, "Intel Setup and Configuration Service (Intel SCS)." User Guide, Version 7.0, Feb. 24, 2011; 147 pages.

(Continued)

*Primary Examiner* — Ponnoreay Pich
(74) *Attorney, Agent, or Firm* — Baker Botts L.L.P.

(57) ABSTRACT

In one or more embodiments, one or more systems, methods, and/or processes may create a task configured to configure an out-of-band system of an unconfigured information handling system and discover configured information handling systems and unconfigured information handling systems that include respective out-of-band systems operable to perform the task independently of respective main processors. The one or more systems, methods, and/or processes may provide, via a network, the task to the respective out-of-band systems of the unconfigured information handling systems. In one or more embodiments, the one or more systems, methods, and/or processes may create another task configured to unconfigure the out-of-band system that was configured via the task configured to configure the out-of-band (Continued)

systems and may provide, via the network, the other task to at least one information handling system that was provided the task configured to configure the out-of-band system.

20 Claims, 6 Drawing Sheets

(56) References Cited

U.S. PATENT DOCUMENTS

| | | | |
|---|---|---|---|
| 2007/0079113 A1* | 4/2007 | Kulkarni | H04L 63/0492 713/150 |
| 2010/0094981 A1* | 4/2010 | Cordray | H04L 69/40 709/222 |
| 2010/0188975 A1* | 7/2010 | Raleigh | G06Q 10/06375 370/230.1 |
| 2016/0234186 A1* | 8/2016 | Leblond | G06Q 10/06 |

OTHER PUBLICATIONS

Intel Corporation, "Intel Setup and Configuration Software (Intel SCS)." Deployment Guide, Version 1.0, Aug. 2015; 65 pages.

Intel Corporation, "Intel Active Management Technology (Intel AMT)." 2011; 30 pages.

* cited by examiner

SYSTEM AND METHOD TO REMOTELY PROVISION OUT-OF-BAND SYSTEM

BACKGROUND

Field of the Disclosure

This disclosure relates generally to information handling systems and more particularly to provisioning of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the past, provisioning information handling systems poses various challenges. For example, information handling systems that include out-of-band (OOB) management systems can be complex. For instance, some OOB management systems require one or more active directories, one or more certificate authorities, and/or one or more certificates (e.g., signed certificates). With the complexity, risk is introduced. For example, a misconfiguration of one or more OOB management systems may result in catastrophe, especially in an enterprise environment. As such, administrators have tended to shy away from utilizing OOB management systems in provisioning information handling systems.

SUMMARY

In one or more embodiments, one or more systems, methods, and/or processes may create a task configured to configure an out-of-band system of an unconfigured information handling system and discover, via a network, configured information handling systems and unconfigured information handling systems that include a respective plurality of out-of-band systems operable to perform the task independently of respective main processors. The task may be provided, via the network, to the unconfigured information handling systems. For example, the task may be provided to the unconfigured information handling systems via a transport layer security encryption session that utilizes a digital certificate. For instance, the digital certificate may be signed by a certificate authority.

In one or more embodiments, the one or more systems, methods, and/or processes may further create an organizational unit and modify a database to include a capability that indicates a presence of an out-of-band system. For example, the organizational unit may manage permissions of the configured information handling systems. A first collection that is configured to store first information indicating the configured information handling systems and a second collection that is configured to store second information indicating the unconfigured information handling systems may be created. In one or more embodiments, the one or more systems, methods, and/or processes may further create a template that includes a profile, that includes a configuration and at least one security policy setting, utilizable with the respective out-of-band systems of the unconfigured information handling systems.

In one or more embodiments, the one or more systems, methods, and/or processes may further create another task configured to unconfigure the out-of-band system that was configured via the task configured to configure the out-of-band system. For example, after the task configured to configure the out-of-band system of the unconfigured information handling system is provided to each of the unconfigured information handling systems, the other task may be provided, via the network, to at least one information handling system that was provided the task configured to configure the out-of-band system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
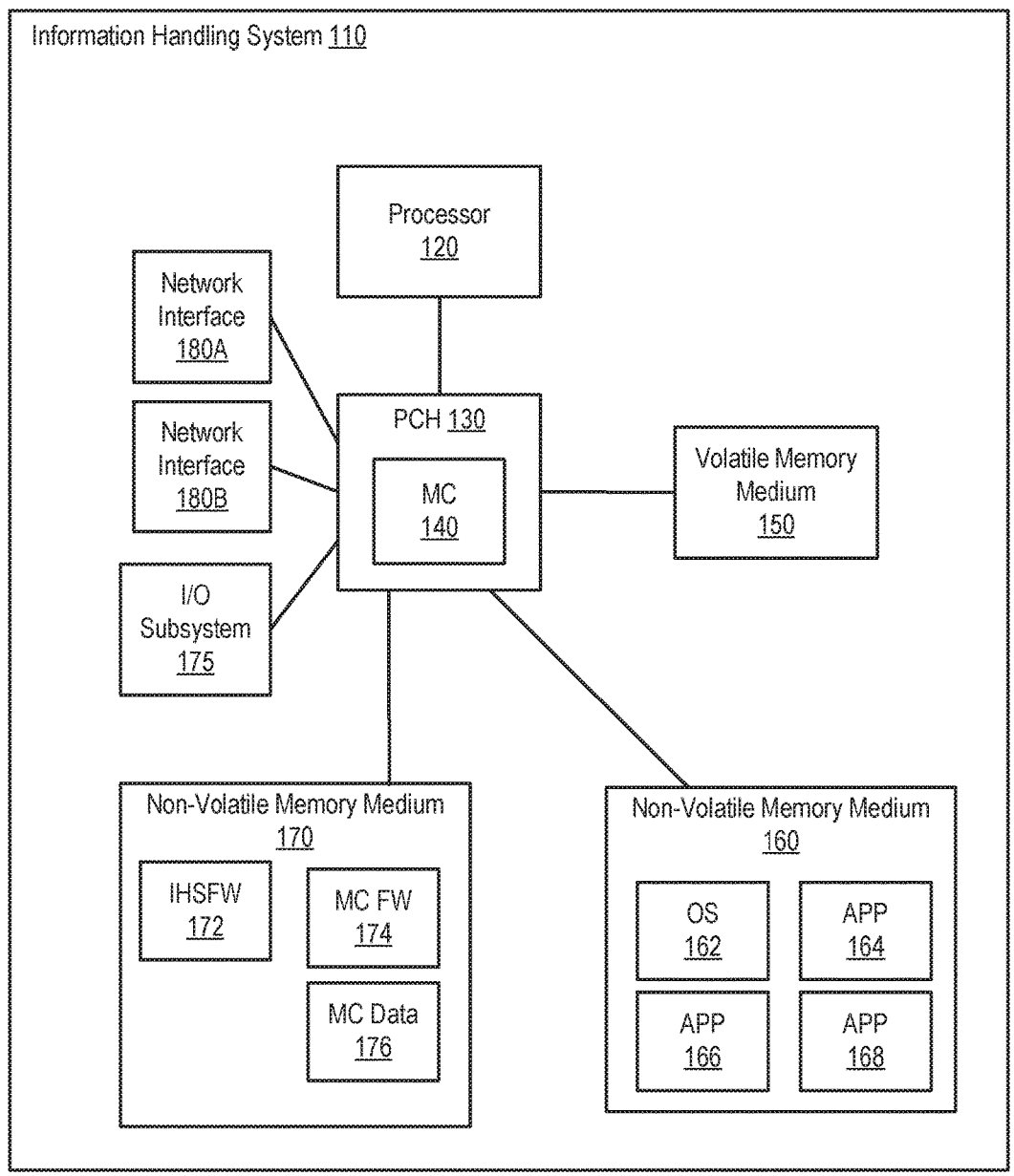
FIG. 1A illustrates an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, provisioning of information handling systems (IHSs) may include setting up and/or configuring an information handling system (IHS) environment and/or associated IHSs (e.g., desktops, laptops, servers, mobile devices, etc.). For example, setting up and/or configuring the IHS environment and/or the associated IHSs may include setting up and/or configuring the IHS environment and/or the associated IHSs that include respective OOB management systems. For instance, the out-of-band (OOB) management systems may be managed via transport layer security (TLS).

In one or more embodiments, a provisioning service may automate and/or guide administrators through one or more of changing environment variables, enrolling a provisioning certificate, discovering capable systems, determining provisioning configuration settings, and deploying the provisioning configuration settings, among others. In one example, the provisioning service may prompt an administrator to create an active directory (AD) account (e.g., a user account) for a service that will run the provisioning service, create a security group for one or more OOB management system administrators, add a provisioning account and a provisioning IHS as members to the security group for one or more OOB management system administrators, and/or create an organizational unit (OU) for IHSs that the provisioning service determines during a provisioning process or method.

In a second example, the provisioning service may add members to the OU with a corresponding configured access control list (ACL), create one or more setup and/or configuration certificate authority (CA) templates that may be utilized in provisioning, and/or configure one or more users with enroll permissions within the CA templates. In another example, the provisioning service may prompt the administrator to create a certificate signing request (CSR) for a third party signed provisioning certificate, prompt the administrator to submit the CSR to a certificate vendor (e.g., manually or via an automated application), import the provisioning certificate, and/or install into a certificate store. For instance, the certificate store may include storage where one or more of certificates, certificate revocation lists, and certificate trust lists, among others, may be stored. In one or more embodiments, the certificate store may include non-volatile storage, although the certificate store may include volatile storage when working with certificates that may not need to be placed in non-volatile storage.

In one or more embodiments, the provisioning service may utilize a template to create an OOB profile. For example, the OOB profile may include a configuration and/or one or more security policy settings for an OOB system. For example, the OOB system may include a management controller, among others. For instance, the OOB profile may be applied to the OOB system during a provisioning process. In one or more embodiments, the one or more security policy settings for the OOB system may include one or more of an ACL, utilization of an AD, and a control mode setting, among others. For example, the control mode setting may include a client control mode setting or an administrator control mode setting, among others. In one instance, the client control mode setting may limit one or more functionalities of the OOB system. In another instance, the administrator control mode setting may not limit one or more functionalities of the OOB system.

Turning now to FIG. 1A, an exemplary information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. Additional components of the information handling system may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, a PCI-Express bus, HyperTransport (HT) bus, and Video Electronics Standards Association (VESA) local bus, among others.

In one or more embodiments, IHS 110 may include firmware that controls and/or communicating with one or more hard drives, network circuitry, one or more memory devices, one or more I/O devices, and/or one or more other peripheral devices. For example, firmware may include software embedded in an IHS component used to perform tasks. In one or more embodiments, firmware may be stored in non-volatile memory, such as storage that does not lose stored data upon the loss of power. In one example, firmware associated with an IHS component may be stored in non-volatile memory that is accessible to one or more IHS components. In another example, firmware associated with an IHS component may be stored in non-volatile memory that may be dedicated to and includes part of that component.

As shown, IHS 110 may include a processor 120, a platform controller hub (PCH) 130, a management controller (MC) 140, a volatile memory medium 150, non-volatile memory media 160 and 170, an I/O subsystem 175, and network interfaces 180A and 180B. As illustrated, processor 120, volatile memory medium 150, non-volatile memory media 160 and 170, I/O subsystem 175, and network interfaces 180A and 180B may be communicatively coupled to PCH 130. In one or more embodiments, PCH 130 may transfer information between or among two or more of processor 120, volatile memory medium 150, non-volatile memory media 160 and 170, I/O subsystem 175, and network interfaces 180A and 180B, among others not specifically illustrated.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk, a CD-ROM, a digital versatile disc (DVD), a random access memory (RAM), a read-only memory (ROM), an electrically erasable programmable read-only memory (EEPROM), and/or a flash memory, a solid state drive (SSD), or any combination of the foregoing.

In one example, volatile memory medium 150 may include volatile storage such as RAM, DRAM (dynamic RAM), EDO RAM (extended data out RAM), SRAM (static RAM), etc. In another example, one or more of non-volatile memory media 160 and 170 may include nonvolatile storage such as a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a compact disc (CD), a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example network interface 180 may enable IHS 110 to communicate over a network utilizing a suitable transmission protocol and/or standard. In a second example, network interface 180A may be coupled to a wired network. In a third example, network interface 180A may be coupled to an optical network. In another example, network interface 180B may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof, among others. In one or more embodiments, a network and its various components may be implemented using hardware, software, or any combination thereof.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and APPs 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172, MC firmware (FW) 174, and MC data 176. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. In one or more embodiments, MC FW 174 may include MC processor instructions that are executable by a MC processor of MC 140.

In one or more embodiments, MC 140 may be or include a microcontroller. In one example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In another example, MC 140 may be or include an Intel® Management Engine (ME). For instance, MC FW 174 may include ME firmware that may be utilized by MC 140 in implementing Intel® Active Management Technology (AMT) functionality. In one or more embodiments, MC 140 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

Figure 1B:
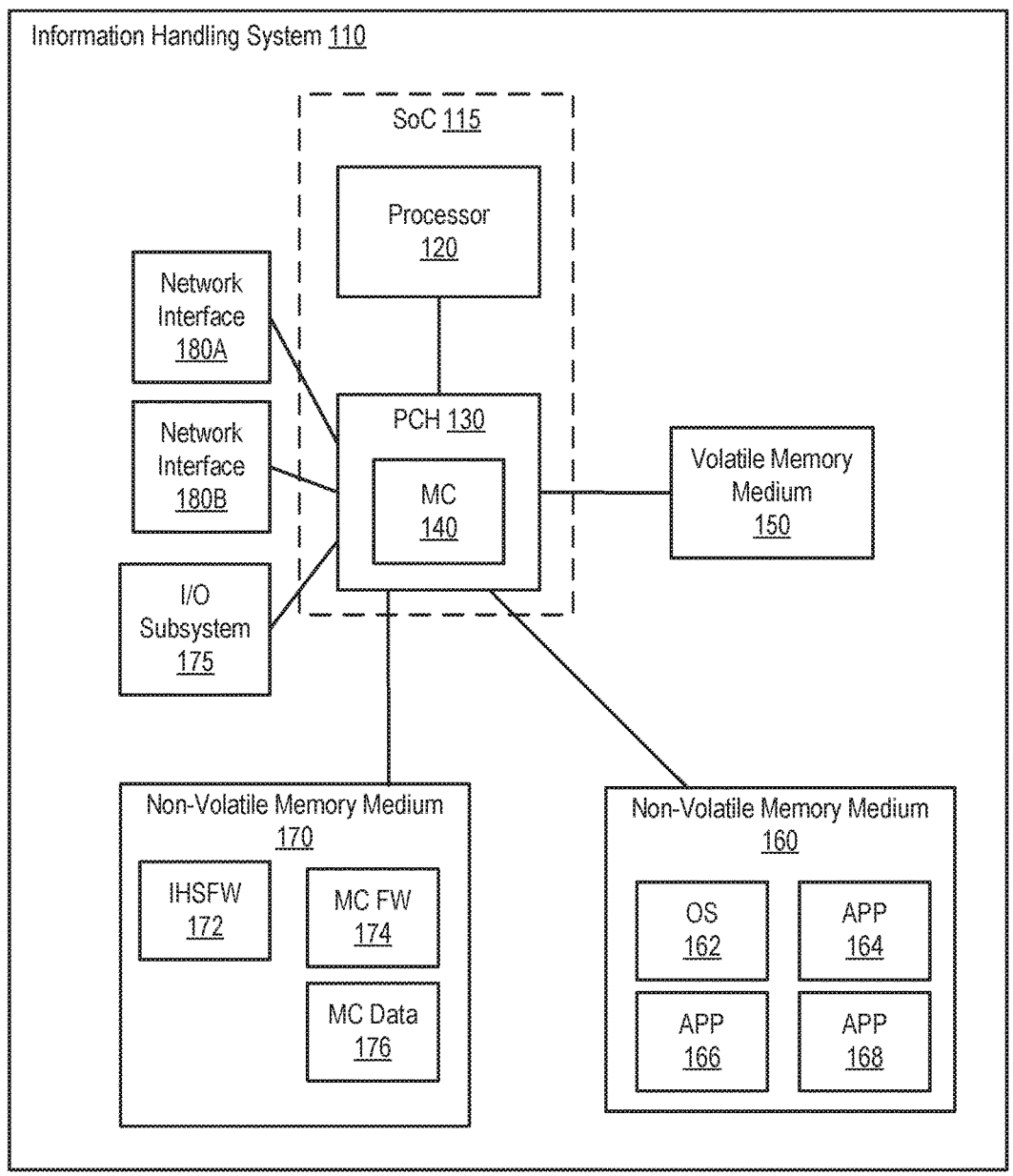
FIG. 1B illustrates an exemplary information handling system that is configured with a system-on-chip, according to one or more embodiments.

In one or more embodiments, processor 120 and PCH 130, among others, may be included in a system-on-chip (SoC). For example, as illustrated in FIG. 1B, a SoC 115 may include processor 120 and PCH 130.

Figure 2:
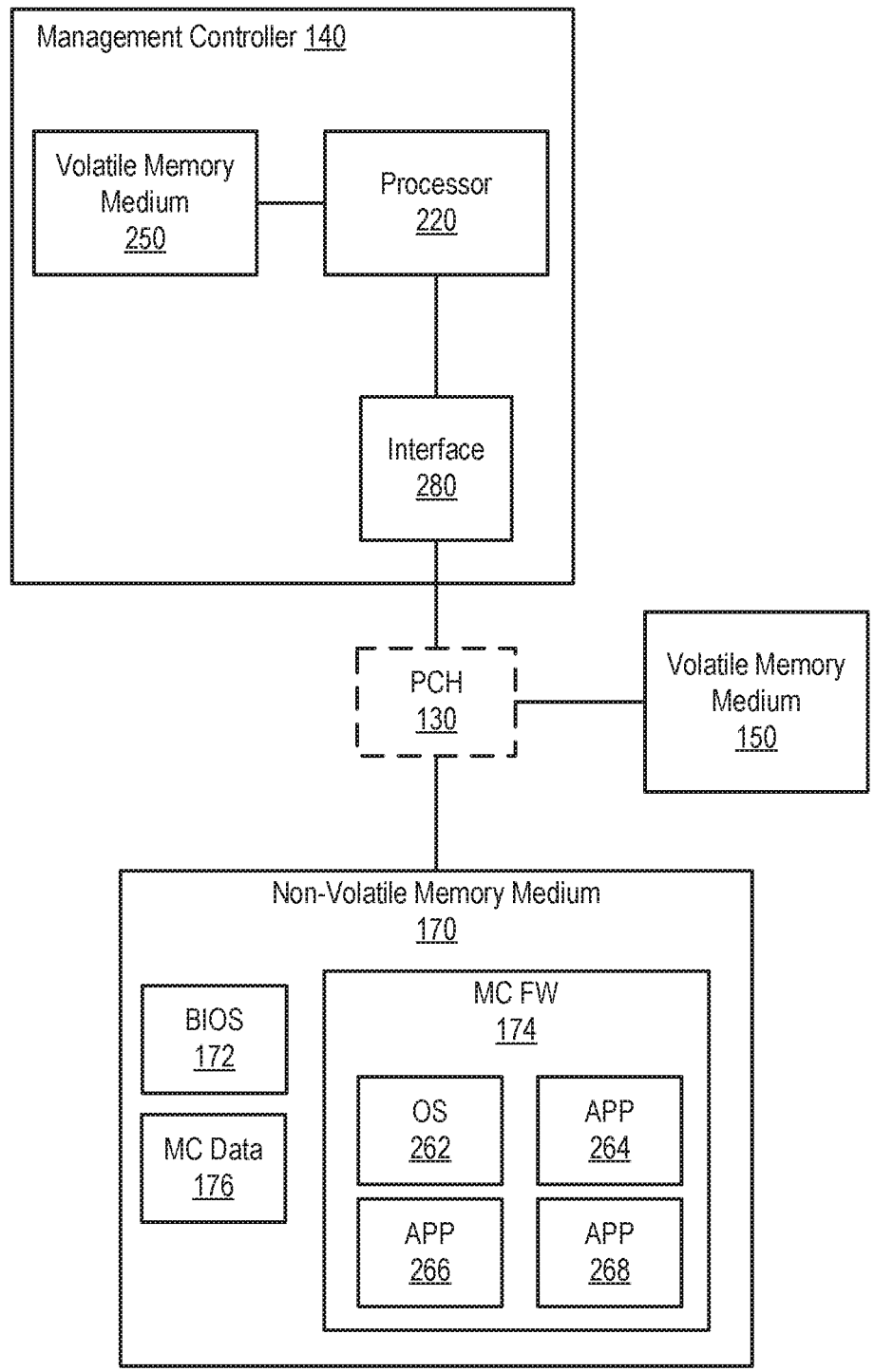
FIG. 2 illustrates an exemplary management controller, according to one or more embodiments.

Turning now to FIG. 2, an exemplary management controller is illustrated, according to one or more embodiments. As shown, MC 140 may include a processor 220, a volatile memory medium 250, and an interface 280. As illustrated, volatile memory medium 250 and interface 280 may be communicatively coupled to processor 220. In one or more embodiments, volatile memory medium 250 may include one or more structures and/or functionalities as those described with reference to volatile memory medium 150.

In one or more embodiments, processor 220 may be communicatively coupled to one or more of memory media 150 and 170 via interface 280 and PCH 130. For example, processor 220 may access one or more of IHSFW 172, MC FW 174, and MC data 176 via interface 280 and PCH 130.

As shown, MC FW 174 may include an OS 262 and APPs 264-268. In one or more embodiments, one or more of OS 262 and APPs 264-268 may include processor instructions executable by processor 220. In one example, processor 220 may execute processor instructions of one or more of OS 262 and APPs 264-268 via non-volatile memory medium 170. In a second example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In another example, one or more portions of the processor instructions of the one or more of OS 262 and APPs 264-268 may be transferred to volatile memory medium 150, and processor 220 may execute the one or more portions of the processor instructions of the one or more of OS 262 and APPs 264-268 via volatile memory medium 150.

In one or more embodiments, processor 220 may utilize MC Data 176. In one example, processor 220 may utilize MC Data 176 via non-volatile memory medium 170. In a second example, one or more portions of MC Data 176 may be transferred to volatile memory medium 250, and processor 220 may utilize MC Data 176 via volatile memory medium 250. In another example, one or more portions of MC Data 176 may be transferred to volatile memory medium 150, and processor 220 may utilize MC Data 176 via volatile memory medium 150.

In one or more embodiments, MC 140 may be utilized in implementing a system and/or service that may provide OOB management of IHS 110. In one example, an OOB system may include one or more of MC 140, MC FW 174, and MC data 176, among others. In a second example, IHS 110 may be managed remotely via MC 140, regardless of power applied to processor 120, regardless of functionality of processor 120, and/or regardless of any functionality of OS 162. For instance, IHS 110 may be managed remotely via MC 140 when no power is applied to processor 120, when processor 120 is not functioning, and/or when OS 162 is not functioning or is not installed. In another example, an APP may be utilized to remotely setup, configure, monitor, maintain, upgrade, and/or repair multiple IHSs. For instance, the APP may be utilized to perform remotely perform enterprise setup, configuration, monitoring, maintenance, upgrades, and/or repairs. In one or more embodiments, processor 120 may be or include a main processor, and the OOB system may perform and/or executed one or more tasks independently from the main processor.

Figure 3:
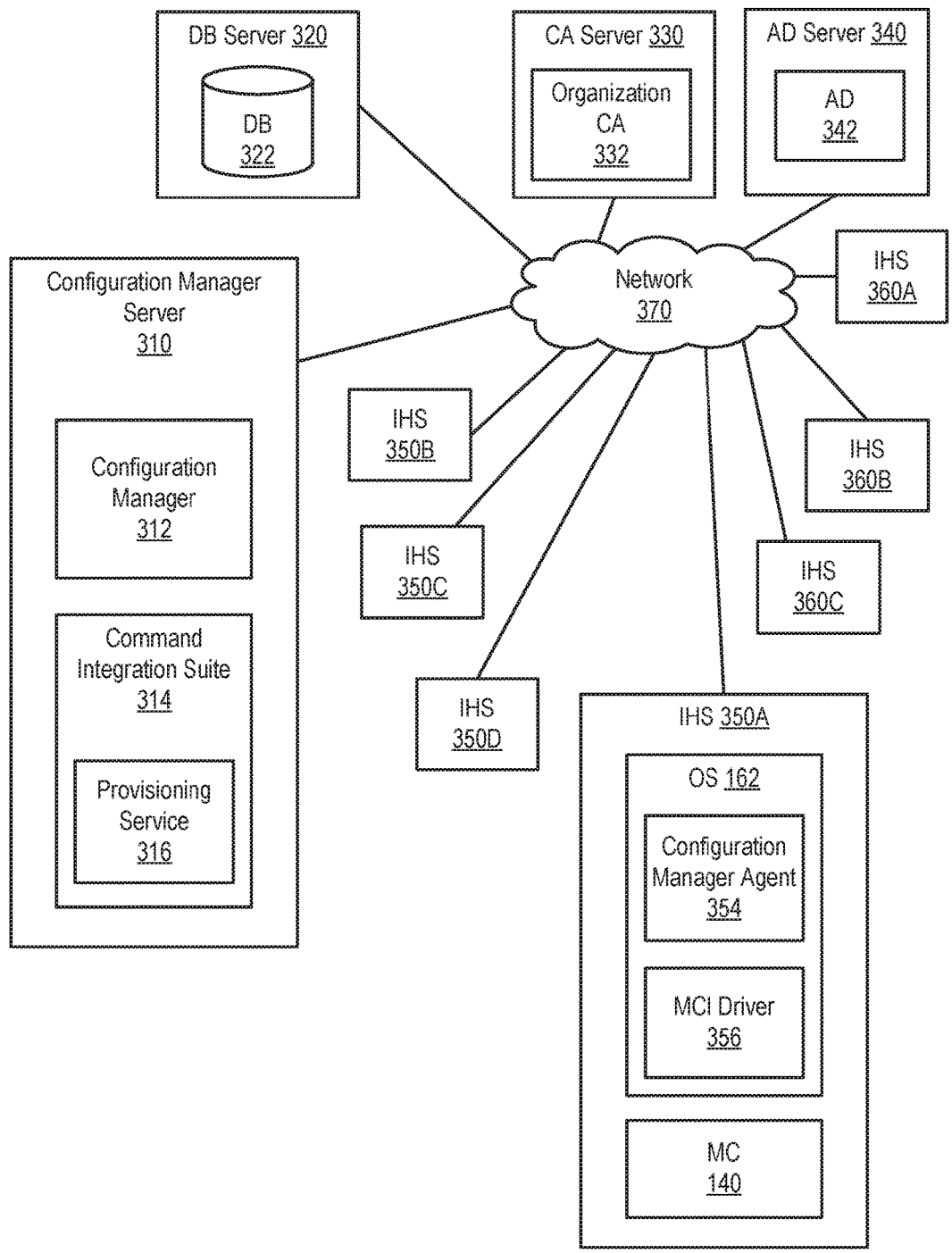
FIG. 3 illustrates an exemplary computing environment, according to one or more embodiments.

Turning now to FIG. 3, an exemplary computing environment is illustrated, according to one or more embodiments. As shown, a configuration manager server 310, a database (DB) server 320, a CA server 330, an AD server 340, IHSs 350A-350D, and IHSs 360A-360C may be coupled to a network 370. In one or more embodiments, network 370 may include a wired network, a wireless network, an optical network, or a combination of the foregoing, among others. For example, network 370 may include and/or be coupled to various types of communications networks. For instance, network 370 may include and/or be coupled to a local area network (LAN), a wide area network (WAN) (e.g., a private WAN, a corporate WAN, a public WAN, etc.), an Internet, a public switched telephone network (PSTN), a cellular telephone network, a satellite telephone network, or a combination of the foregoing, among others. In one or more embodiments, each of one or more of IHSs 350A-350D may include one or more structures and/or functionalities as those described with reference to IHS 110, each of IHSs 360A-360C may include one or more structures and/or functionalities as those described with reference to IHS 110 without a respective management controller, and each of configuration manager server 310, DB server 320, CA server 330, and AD server 340 may include one or more structures and/or functionalities as those described with reference to IHS 110 with or without a respective management controller.

As illustrated, configuration manager server 310 may include a configuration manager 312 and a command integration suite 314 that may include a provisioning service 316. For example, configuration manager server 310 may be or include a management console computer system. In one or more embodiments, command integration suite 314 may be a plug-in and/or an add-on to configuration manager 312. In one example, configuration manager 312 may be or include a System Center Configuration Manager (available from Microsoft Corporation). In a second example, configuration manager 312 may be or include a LANDESK Management Suite (available from LANDESK Software Corporation). In a third example, configuration manager 312 may be or include a Symantec Client Management Suite (available from Symantec Corporation). In another example, command integration suite 314 may be or include a Dell Command Integration Suite (available from Dell Computer Corporation).

In one or more embodiments, configuration manager 312 and command integration suite 314 may include processor instructions that are executable by a processor of configuration manager server 310. As shown, DB server may include a DB 322. In one or more embodiments, DB 322 may include processor instructions that are executable by a processor of DB 320 and/or data utilized in providing one or more database services. As illustrated, CA server 330 may include an organization CA 332. For example, organization CA 332 may be or include a corporate CA. In one or more embodiments, organization CA 332 may include processor instructions that are executable by a processor of organization CA 332. As shown, AD server 340 may include an AD 342. In one or more embodiments, AD 342 may include processor instructions that are executable by a processor of organization AD server 340.

As illustrated, OS 162 that may include a configuration manager agent 354 and a management controller interface (MCI) driver 356. In one example, configuration manager agent 354 may be or include a service that executes via OS 162. In another example, MCI driver 356 may be or include a device driver that may provide an interface to MC 140. In one or more embodiments, one or more of IHSs 350B-350D may include one or more structures and/or functionalities as those described with reference to IHS 350A.

Figure 4A:
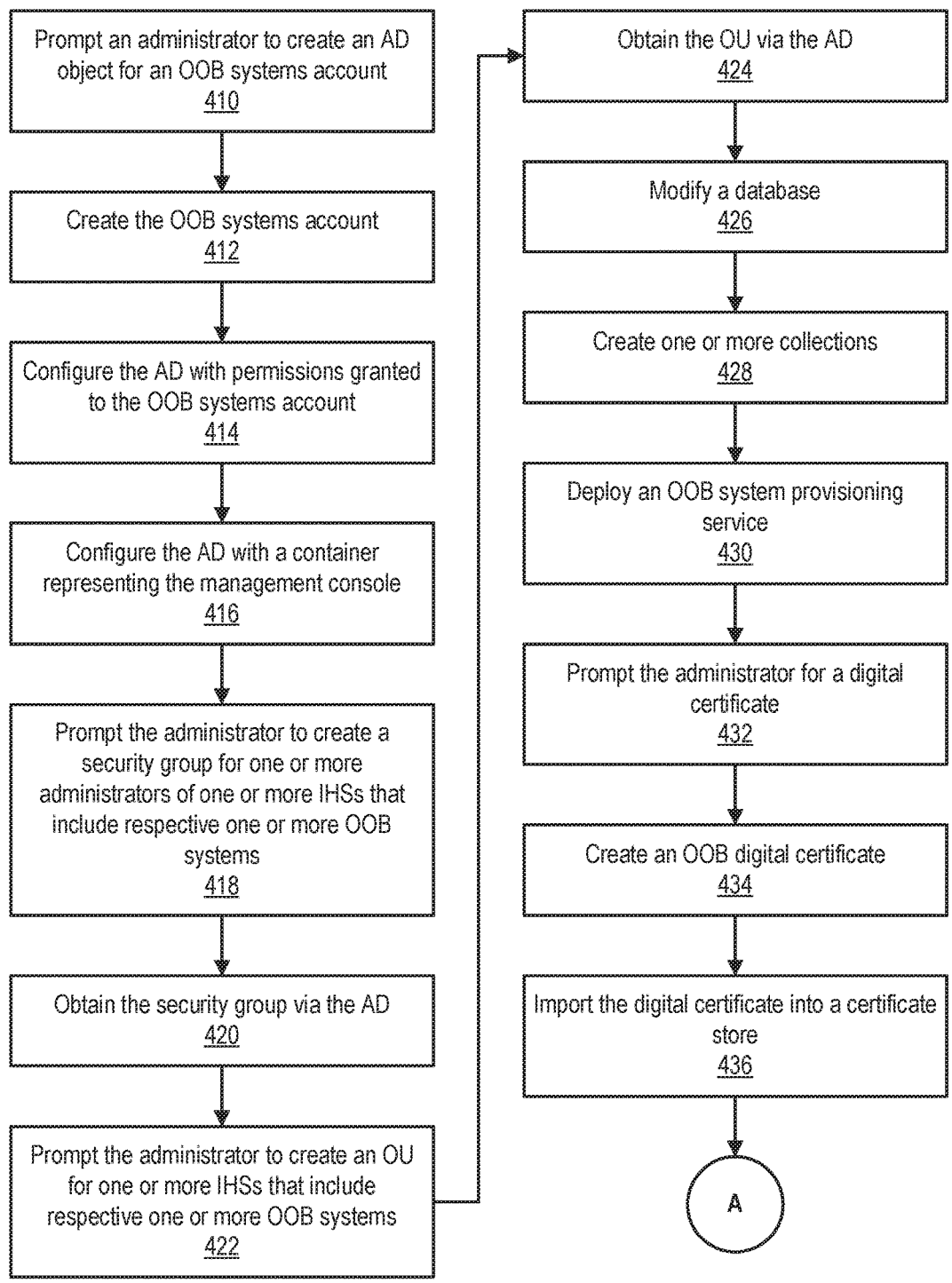
FIGS. 4A and 4B illustrate an exemplary method of utilizing a provisioning service, according to one or more embodiments.
Figure 4B:
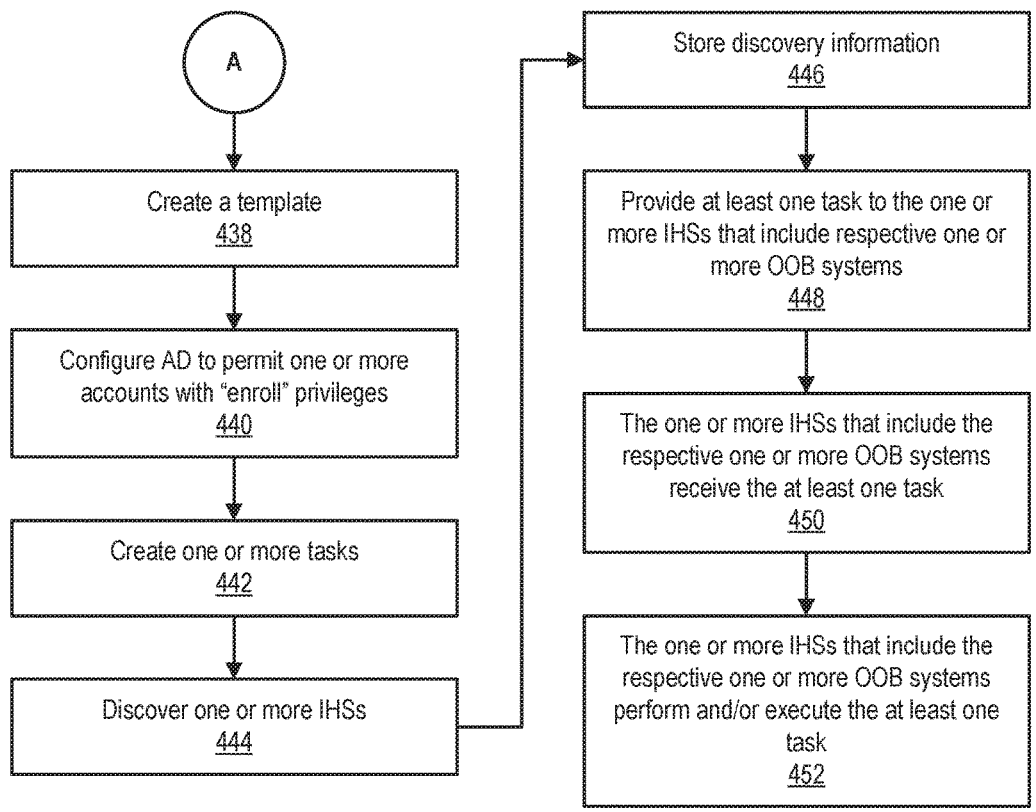

Turning now to FIGS. 4A and 4B, an exemplary method of utilizing a provisioning service is illustrated, according to one or more embodiments. At 410, an administrator (e.g., a user) may be prompted to create an AD object for an OOB systems account that will be utilized for administrating IHSs with respective OOB systems. In one or more embodiments, the AD may be or include AD 342. At 412, the OOB systems account may be created. For example, provisioning service 316 may create the OOB systems account in AD 342. In one or more embodiments, when provisioning service 316 performs an action, described herein, provisioning service 316 may perform the action via configuration manager 312. For example, when provisioning service 316 performs an action that involves one or more of DB 322 and AD 342, among others, provisioning service 316 may perform the action via configuration manager 312. In one or more embodiments, the OOB systems account may correspond to a management console (e.g., an IHS that manages other IHSs).

At 414, the AD may be configured with permissions granted to the OOB systems account. At 416, the AD may be configured with a container that may represent the management console. For example, AD 342 may be configured with a container that may represent configuration manager server 310. For instance, the account corresponding to configuration manager server 310 may be associated with the container. At 418, the administrator may be prompted to create a security group for one or more administrators of one or more IHSs that include respective one or more OOB systems.

At 420, the security group may be obtained via the AD. In one example, obtaining the security group via the AD may include creating the security group in AD 342. In another example, obtaining the security group via the AD may include selecting an existing security group in AD 342. In one or more embodiments, the security group may be utilized in grouping the provisioning service with one or more administrators of the IHSs. For example, the security group may include the account corresponding to configuration manager server 310. In one or more embodiments, the security group may be utilized in managing permissions for one or more configuration services. For example, the one or more configuration services may include one or more of Setup and Configuration Software (SCS) (available from Intel Corporation) and Remote Configuration Service (RCS) (available from Intel Corporation), among others.

At 422, the administrator may be prompted to create an OU for one or more accounts corresponding to one or more IHSs that include respective one or more OOB systems. At 424, an OU may be obtained via the AD. In one example, obtaining the OU via the AD may include creating the OU in AD 342. In another example, obtaining the OU via the AD may include selecting an existing OU in AD 342. In one embodiment, the OU may be utilized in managing permissions of the IHSs. For example, one or more permissions for the OU may include one or more of permitting creation of IHS objects, permitting deletion of IHS objects, permitting a listing of contents, permitting a change of one or more passwords, and permitting writing of all properties, among others.

At 426, a database may be modified. In one or more embodiments, configuration manager 312 may utilize DB 322 in storing and/or managing data. For example, provisioning service 316 may modify DB 322 to store and/or manage data associated with IHSs of a computing environment (e.g., IHSs 350, IHSs 360, etc.). In one instance, DB 322 may be modified to include a respective capability, that indicates a presence of a management controller utilizable to perform OOB tasks for multiple IHSs. In a second instance, DB 322 may be modified to include a respective capability, that indicates a presence of OOB system utilizable to perform OOB tasks for multiple IHSs. In another instance, DB 322 may be modified to include a respective status that indicates configured or unconfigured for the IHSs.

At 428, one or more collections may be created. For example, provisioning service 316 may create the one or more collections. In one instance, provisioning service 316 may create the one or more collections via DB 322. In another instance, provisioning service 316 may utilize configuration manager 312 to create the one or more collections via DB 322. In one or more embodiments, the one or more collections may organize instances of inventory classes.

In one or more embodiments, a collection of the one or more collections may include a grouping of objects. For example, the objects may include user objects, computer objects, etc. In one or more embodiments, the one or more collections may be created to classify a status of a MC on an IHS (e.g., IHS 350). For example, the one or more collections may include one or more of a configured collection, an unconfigured collection, and a maintenance collection, among others. In one or more embodiments, the one or more collections may be populated by IHSs, based off a key value that is to be interrogated via an inventory process. For example, the inventory process may be an inventory process of configuration manager 312. For instance, the status of the MC on the IHS may indicate that the IHS is configured or not configured.

At 430, an OOB system provisioning service may be deployed. At 432, the administrator may be prompted for a digital certificate (e.g., a digital security certificate). At 434, an OOB digital certificate may be created. In one or more embodiments, the administrator may be prompted to create a CSR for a third party signed provisioning certificate, and the administrator may be prompt to submit the CSR to a certificate vendor (e.g., manually or via an automated application). For example, the provisioning certificate may be imported and/or installed into a certificate store. In one or more embodiments, the OOB digital certificate may be created via a CA. For example, the CA may be or include the third-party. In one or more embodiments, an OOB system of an IHS may include one or more root certificate hashes from one or more certificate authorities (CAs). In one example, the one or more CAs may include one or more commercial CAs (e.g., EnTrust, Verisign, Starfield, Comodo, GoDaddy, Baltimore CyberTrust, GTE CyberTrust, etc.). In another example, the one or more CAs may include one or more private CAs. For instance, an OOB system of an IHS may include one or more root certificate hashes that are self-signed.

At 436, the digital certificate may be imported into a certificate store. For example, a certificate may be imported into a certificate store of configuration manager server 310. In one or more embodiments, the digital certificate may be or include a third-party signed digital certificate. For example, a third party may be or include a CA. For instance, the digital certificate may have been previously submitted to the third-party for signing. In one or more embodiments, the digital certificate may be utilized in authorizing and/or authenticating the IHS. For example, the digital certificate may be utilized in authorizing and/or authenticating configuration manager server 310 in providing one or more provisioning configuration settings. In one instance, the digital certificate may be utilized in initiating a TLS encryption session. In another instance, the digital certificate may be utilized in conducting authenticated data communications At 438, a template may be created. For example, a configuration CA template may be created. For instance, the CA template may be utilized in provisioning. In one or more embodiments, members may be added to the OU with a corresponding configured ACL, create one or more setup and/or configuration CA templates that may be utilized in provisioning, and/or configure one or more users with enroll permissions within the CA templates.

In one or more embodiments, certificates enrolled from the CA template may be utilized with TLS. For instance, TLS may be utilized in securing communications between or among configuration manager server 310 and one or more of OOB system of IHSs 350.

In one or more embodiments, TLS may include one or more cryptographic protocols that provide communications security via a communications network (e.g., network 370). For example, TLS may provide privacy and data integrity between two communicating computer applications. In one instance, cryptography may be utilized to encrypt and decrypt data transmitted between the two communicating computer applications. In a second instance, identity and/or authentication of communicating parties may be authenticated using public-key cryptography and/or signed certificates. In another instance, TLS may ensures integrity, as each message transmitted may includes a message integrity check utilizing a message authentication code that may prevent undetected loss and/or alteration of data of the message during communication and/or conveyance via the communications network.

At 440, the CA may be configured to permit one or more accounts with "enroll" privileges on one or more CA templates. For example, CA 332 may be configured to permit one or more accounts of the security group with "enroll" privileges on one or more CA templates. At 442, one or more tasks may be created. For example, configuration manager server 310 may create the one or more tasks. For instance, the one or more tasks may include one or more of a discovery task, a configuration task, a maintenance task, and an unconfiguration task, among others.

At 444, one or more IHSs may be discovered. For example, the discover task may discover the one or more IHSs. In one or more embodiments, discovery may provide discovery information that may include one or more of configurations, states, features, firmware versions, and capabilities, among others, of IHSs that include respective OOB systems. For example, the discovery information may be stored via DB 322. For instance, the discovery information may be utilized in determining a process to configure and/or maintain the IHSs that include respective OOB systems. In one or more embodiments, configuration manager server 310 may utilize the one or more configuration services in discovering and/or determining the discovery information. In one example, configuration manager server 310 may utilize SCS in discovering and/or determining the discovery information. In another example, configuration manager server 310 may utilize RCS in discovering and/or determining the discovery information. For instance, RCS may utilize a web-services management (WS-MAN) interface in discovering, determining, and/or gathering the discovery information via the IHSs that include respective OOB systems.

At 446, the discovery information may be stored. For example, configuration manager server 310 may store the discovery information via DB 322. At 448, at least one task of the one or more tasks may be provided to the one or more IHSs that include the respective one or more OOB systems. In one example, configuration manager server 310 may provide the configuration task to one or more of IHSs 350. In another example, configuration manager server 310 may provide the unconfiguration task to one or more of IHSs 350.

At 450, the one or more IHSs that include the respective one or more OOB systems may receive the at least one task and perform and/or execute the at least one task. For example, IHS 350 may receive the at least one task and perform and/or execute the at least one task. In one instance, IHS 350 may receive the configuration task. In another instance, IHS 350 may receive the unconfiguration task.

At 452, the one or more IHSs that include the respective one or more OOB systems may perform and/or execute the at least one task. In one example, the one or more IHSs that include the respective one or more OOB systems may perform and/or execute the configuration task. In another example, the one or more IHSs that include the respective one or more OOB systems may perform and/or execute the unconfiguration task. In one or more embodiments, the unconfiguration task may remove one or more configuration changes. For example, the unconfiguration task may remove one or more configuration changes implemented via the configuration task. For instance, the unconfiguration task may perform a "rollback" task that rolls back an OOB system to a previous configuration.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a processor; and
   a memory medium coupled to the processor;
   wherein the memory medium stores instructions executable by the processor and as the processor executes the instructions, the system:
   creates a task configured to configure an out-of-band system of an unconfigured information handling system;
   discovers, via a network, a first plurality of configured information handling systems;
   discovers, via the network, a second plurality of unconfigured information handling systems that include a respective plurality of out-of-band systems operable to perform the task independently of respective main processors; and
   provides, via the network, the task to the respective plurality of out-of-band systems of the second plurality of unconfigured information handling systems.

2. The system of claim 1, wherein the system further:
   creates an organizational unit;

modifies a database to include a capability that indicates a presence of an out-of-band system;
creates a first collection that is configured to store first information indicating the first plurality of configured information handling systems;
creates a second collection that is configured to store second information indicating the second plurality of unconfigured information handling systems;
stores a digital certificate that is utilizable in conducting authenticated data communications; and
creates a template that includes a profile, that includes a configuration and at least one security policy setting, utilizable with the respective plurality of out-of-band systems of the second plurality of unconfigured information handling systems.

3. The system of claim 2, wherein the organizational unit manages permissions of the first plurality of configured information handling systems.

4. The system of claim 2, wherein the digital certificate is signed by a certificate authority.

5. The system of claim 1, wherein when the system provides, via the network, the task to the respective plurality of out-of-band systems of the second plurality of unconfigured information handling systems, the system provides the task to the respective plurality of out-of-band systems of the second plurality of unconfigured information handling systems via a transport layer security encryption session that utilizes a digital certificate.

6. The system of claim 1, wherein the system further:
creates another task configured to unconfigure the out-of-band system that was configured via the task configured to configure the out-of-band system; and
after the system provides, via the network, the task configured to configure the out-of-band system of the unconfigured information handling system to each of the second plurality of unconfigured information handling systems, the system provides, via the network, the other task to at least one information handling system that was provided the task configured to configure the out-of-band system.

7. The system of claim 1, wherein when the system discovers, via the network, the second plurality of unconfigured information handling systems, the system determines discovery information that includes at least one of a configuration, a state, a firmware version, and a capability of each of the second plurality of unconfigured information handling systems.

8. A method, comprising:
creating a task configured to configure an out-of-band system of an unconfigured information handling system;
discovering, via a network, a first plurality of configured information handling systems;
discovering, via the network, a second plurality of unconfigured information handling systems that include a respective plurality of out-of-band systems operable to perform the task independently of a respective main processor; and
providing, via the network, the task to the respective plurality of out-of-band systems of the second plurality of unconfigured information handling systems.

9. The method of claim 8, further comprising:
creating an organizational unit via an active directory;
modifying a database to include a capability that indicates a presence of an out-of-band system;
creating a first collection that is configured to store first information indicating a first plurality of configured information handling systems;
creating a second collection that is configured to store second information indicating a second plurality of unconfigured information handling systems;
storing a digital certificate that is utilizable in conducting authenticated data communications;
creating a template that includes a profile, that includes a configuration and at least one security policy setting, utilizable with a plurality of out-of-band systems respectively corresponding to the second plurality of unconfigured information handling systems.

10. The method of claim 9, wherein the organizational unit manages permissions of the first plurality of information handling systems.

11. The method of claim 9, wherein the digital certificate is signed by a certificate authority.

12. The method of claim 8, wherein the providing, via the network, the task to the respective plurality of out-of-band systems of the second plurality of unconfigured information handling systems includes providing, via the network, the task to the respective plurality of out-of-band systems of the second plurality of unconfigured information handling systems via a transport layer security encryption session that utilizes a digital certificate.

13. The method of claim 8, further comprising:
creating another task configured to unconfigure the out-of-band system that was configured via the task configured to configure the out-of-band system; and
after the providing, via the network, the task to the respective plurality of out-of-band systems of the second plurality of unconfigured information handling systems, providing, via the network, the other task to at least one information handling system that was provided the task configured to configure the out-of-band system.

14. The method of claim 8, wherein the discovering, via the network, the second plurality of unconfigured information handling systems includes determining discovery information that includes at least one of a configuration, a state, a firmware version, and a capability of each of the second plurality of unconfigured information handling systems.

15. A non-transitory computer-readable memory medium comprising instructions, executable by a processor of a system, that when executed by the processor, the system:
creates a task configured to configure an out-of-band system of an unconfigured information handling system;
discovers, via a network, a first plurality of configured information handling systems;
discovers, via the network, a second plurality of unconfigured information handling systems that include a respective plurality of out-of-band systems operable to perform the task independently of respective main processors; and
provides, via the network, the task to the respective plurality of out-of-band systems of the second plurality of unconfigured information handling systems.

16. The non-transitory computer-readable memory medium of claim 15, wherein the system further:
creates an organizational unit;
modifies a database to include a capability that indicates a presence of an out-of-band system;
creates a first collection that is configured to store first information indicating the first plurality of configured information handling systems;

creates a second collection that is configured to store second information indicating the second plurality of unconfigured information handling systems;

stores a digital certificate that is utilizable in conducting authenticated data communications; and creates a template that includes a profile, that includes a configuration and at least one security policy setting, utilizable with the respective plurality of out-of-band systems of the second plurality of unconfigured information handling systems.

17. The non-transitory computer-readable memory medium of claim 16, wherein the organizational unit manages permissions of the first plurality of information handling systems.

18. The non-transitory computer-readable memory medium of claim 15, wherein the system further:

creates another task configured to unconfigure the out-of-band system that was configured via the task configured to configure the out-of-band system; and after the system provides, via the network, the other task configured to configure the out-of-band system of the unconfigured information handling system to each of the second plurality of unconfigured information handling systems, the system provides, via the network, the other task to at least one information handling system that was provided the task configured to configure the out-of-band system.

19. The non-transitory computer-readable memory medium of claim 15, wherein when the system provides, via the network, the task to the respective plurality of out-of-band systems of the second plurality of unconfigured information handling systems, the system provides the task to the respective plurality of out-of-band systems of the second plurality of unconfigured information handling systems via a transport layer security encryption session that utilizes a digital certificate.

20. The non-transitory computer-readable memory medium of claim 15, wherein when the system discovers, via the network, the second plurality of unconfigured information handling systems, the system determines discovery information that includes at least one of a configuration, a state, a firmware version, and a capability of each of the second plurality of unconfigured information handling systems.

* * * * *